US011116015B2

(12) United States Patent
Menon et al.

(10) Patent No.: US 11,116,015 B2
(45) Date of Patent: Sep. 7, 2021

(54) EFFICIENT METHOD OF DL-CINR MEASUREMENT AND REPORTING IN NB IOT

(71) Applicant: QUALCOMM Incorporated, San Diego, CA (US)

(72) Inventors: Srikanth Menon, Hyderabad (IN); Raghavendra Shyam Ananda, Hyderabad (IN); Praveen Maruthoormana Purushothaman, Ernakulam (IN); Alberto Rico Alvarino, San Diego, CA (US); Mungal Singh Dhanda, Slough (GB); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/273,904

(22) Filed: Feb. 12, 2019

(65) Prior Publication Data
US 2019/0268949 A1     Aug. 29, 2019

Related U.S. Application Data

(60) Provisional application No. 62/634,583, filed on Feb. 23, 2018.

(51) Int. Cl.
*H04W 74/08*     (2009.01)
*H04B 17/336*     (2015.01)
(Continued)

(52) U.S. Cl.
CPC ...... *H04W 74/0858* (2013.01); *H04B 17/327* (2015.01); *H04B 17/336* (2015.01);
(Continued)

(58) Field of Classification Search
CPC .............. H04W 74/0858; H04W 76/10; H04B 17/336; H04L 5/0048; H04L 5/0098
See application file for complete search history.

(56) References Cited

U.S. PATENT DOCUMENTS

| 8,345,571 B2* | 1/2013 | Kwon | H04W 72/1284 370/252 |
| 2016/0183112 A1* | 6/2016 | Yang | H04B 17/18 370/252 |

(Continued)

FOREIGN PATENT DOCUMENTS

| WO | WO-2009038303 A1 | 3/2009 |
| WO | WO-2017169461 A1 | 10/2017 |

OTHER PUBLICATIONS

International Search Report and Written Opinion—PCT/US2019/017871—ISA/EPO—dated Apr. 15, 2019.

*Primary Examiner* — Rhonda L Murphy
(74) *Attorney, Agent, or Firm* — QUALCOMM Incorporated

(57) ABSTRACT

An aspect of the present disclosure includes methods, systems, and computer-readable media for receiving, at the UE, a random access response including a first signal via a first physical channel and a second signal via a second physical channel from a base station (BS), generating a connection request based on the random access response, estimating a carrier to interference plus noise ratio (CINR) of a random-access channel based on at least one the first signal or the second signal, and sending a message including the CINR and the connection request to the BS in response to the random access response.

30 Claims, 8 Drawing Sheets

(51) Int. Cl.
    *H04B 17/327*    (2015.01)
    *H04W 76/10*     (2018.01)
    *H04W 24/10*     (2009.01)
    *H04L 5/00*       (2006.01)
    *H04L 25/02*     (2006.01)
    *H04L 27/26*     (2006.01)
    *H04L 1/00*       (2006.01)
    *H04L 5/14*       (2006.01)

(52) U.S. Cl.
    CPC ............... *H04L 1/00* (2013.01); *H04L 5/001* (2013.01); *H04L 5/0048* (2013.01); *H04L 5/0053* (2013.01); *H04L 5/0085* (2013.01); *H04L 5/0098* (2013.01); *H04L 25/02* (2013.01); *H04L 27/26* (2013.01); *H04W 24/10* (2013.01); *H04W 76/10* (2018.02); *H04L 5/006* (2013.01); *H04L 5/0023* (2013.01); *H04L 5/14* (2013.01)

(56) References Cited

U.S. PATENT DOCUMENTS

2017/0359114 A1   12/2017   Akkarakaran et al.
2018/0352590 A1*  12/2018   Sha .................... H04W 72/0453
2019/0124699 A1*   4/2019   Yamada ................. H04L 27/26
2020/0036430 A1*   1/2020   Kim .................... H04L 25/0204

\* cited by examiner

EFFICIENT METHOD OF DL-CINR MEASUREMENT AND REPORTING IN NB IOT

CROSS REFERENCE TO RELATED APPLICATIONS

The present application claims priority to U.S. Provisional Application No. 62/634,583, filed on Feb. 23, 2018, entitled "Efficient Method of DL-CINR Measurement and Reporting in NB TOT," the content of which is incorporated by reference in its entirety.

BACKGROUND

Aspects of the present disclosure relate generally to wireless communication networks, and more particularly, to apparatus and methods of measurement and reporting conditions, such as a carrier to interference plus noise ratio (CINR), by a narrowband internet of things user equipment (NB-IoT UE).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

A UE in a wireless communication network periodically reports measurements, such as channel quality and/or conditions, to a base station (BS) in the network. For example, in some scenarios, a UE may transmit such measurement reports relating to an anchor carrier as part of a random access procedure when trying to establish a communication link with the BS. A UE in idle mode, such as a NB-IoT UE, may have less stringent measurement requirements, however, and so such measurements may be less accurate and/or may become stale or outdated. Moreover, the UE typically makes such measurements on an anchor carrier, which may create problems when the UE is attempting a random access procedure on a non-anchor carrier. For instance, the non-anchor carrier may have different and/or unpredictable radio/channel qualities and/or conditions as compared to the anchor carrier. Further, it may be difficult for the NB-IoT UE to evaluate the channel quality and/or conditions of the non-anchor carrier early in the random access procedure due to the unavailability of narrowband reference signals. Therefore, improvements in measurement reporting, such as associated with the random access procedure, are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure includes a method for receiving, at the UE, a random access response including a first signal via a first physical channel and a second signal via a second physical channel from a base station (BS), generating a connection request based on the random access response, estimating a carrier to interference plus noise ratio (CINR) of a random-access channel based on at least one of the first signal or the second signal, and sending a message including the CINR and the connection request to the BS in response to the random access response.

Other aspects of the present disclosure include a UE having a memory, a transceiver, and one or more processors operatively connected to the memory and the transceiver, the one or more processors being configured to perform the steps of receiving, via the transceiver at the UE, a random access response including a first signal via a first physical channel and a second signal via a second physical channel from a base station (BS), generating a connection request based on the random access response, estimating a carrier to interference plus noise ratio (CINR) of a random-access channel based on at least one of the first signal or the second signal, and sending, via the transceiver, a message including the CINR and the connection request to the BS in response to the random access response.

Some aspects of the present disclosure include a non-transitory computer-readable medium having instructions that, when executed by one or more processors, cause the one or more processors to perform the steps of receiving, at the UE, a random access response including a first signal via a first physical channel and a second signal via a second physical channel from a base station (BS), generating a connection request based on the random access response, estimating a carrier to interference plus noise ratio (CINR) of a random-access channel based on at least one of the first signal or the second signal, and sending a message including the CINR and the connection request to the BS in response to the random access response.

Another aspect of the present disclosure includes a UE having means for receiving, at the UE, a random access response including a first signal via a first physical channel and a second signal via a second physical channel from a base station (BS), means for generating a connection request based on the random access response, means for estimating a carrier to interference plus noise ratio (CINR) of a random-access channel based on at least one of the first signal or the second signal, and means for sending a message including the CINR and the connection request to the BS in response to the random access response.

An aspect of the present disclosure includes a method for transmitting, from the BS, a random access response including a first signal via a first physical channel and a second signal via a second physical channel to a UE and receiving a message including the CINR and the connection request from the UE in response to the random access response.

Other aspects of the present disclosure include a UE having a memory, a transceiver, and one or more processors operatively connected to the memory and the transceiver, the one or more processors being configured to perform the steps of transmitting, via the transceiver, a random access response including a first signal via a first physical channel and a second signal via a second physical channel to a UE and receiving, via the transceiver, a message including the CINR and the connection request from the UE in response to the random access response.

Some aspects of the present disclosure include anon-transitory computer-readable medium having instructions that, when executed by one or more processors, cause the one or more processors to perform the steps of transmitting, from the BS, a random access response including a first signal via a first physical channel and a second signal via a second physical channel to a UE and receiving a message including the CINR and the connection request from the UE in response to the random access response.

Another aspect of the present disclosure includes a UE having means for transmitting, from the BS, a random access response including a first signal via a first physical channel and a second signal via a second physical channel to a UE and means for receiving a message including the CINR and the connection request from the UE in response to the random access response.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
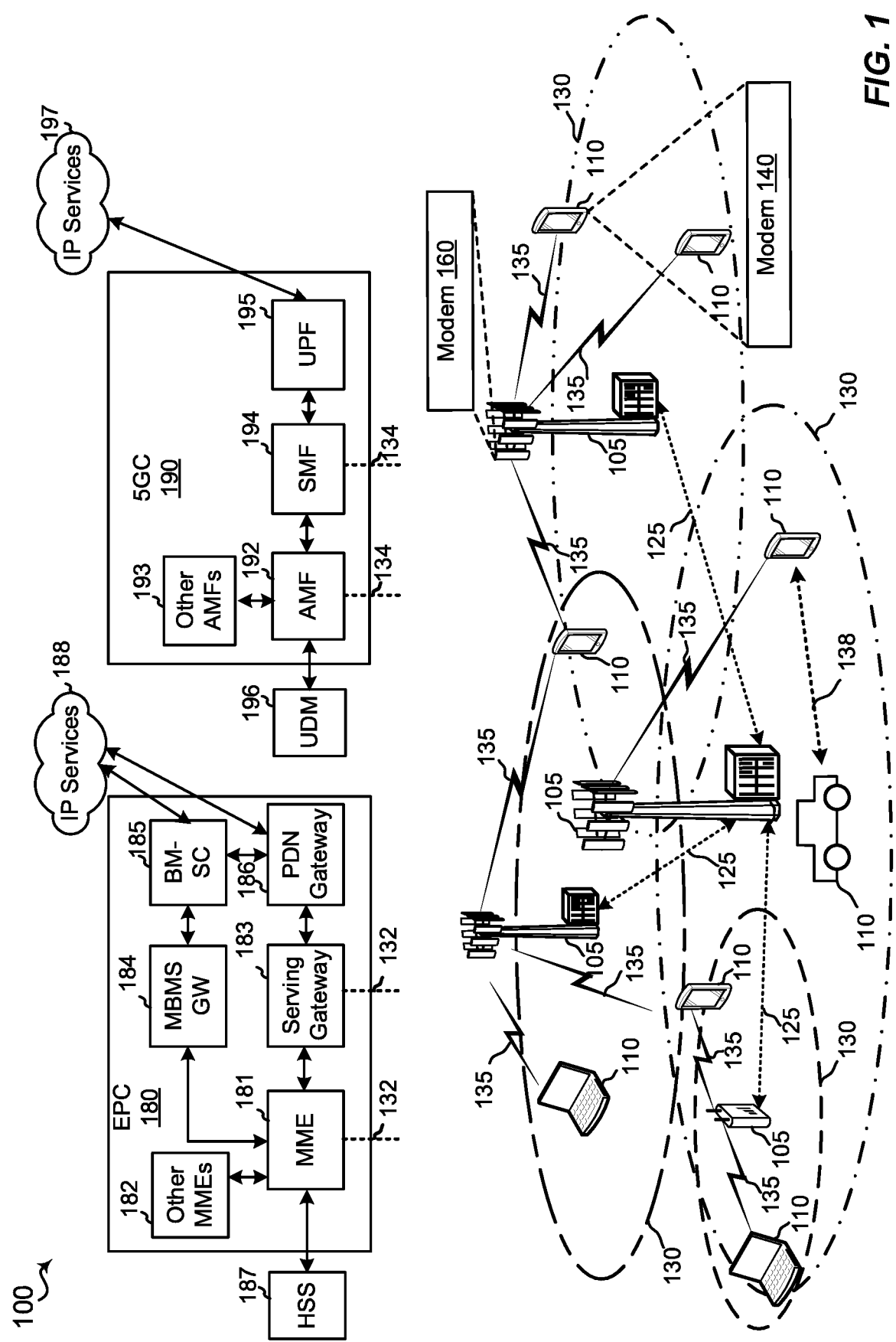
FIG. 1 is a schematic diagram of an example of a wireless communication network including at least one user equipment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, such as a computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

A network may allow a UE to perform a random access channel procedure on a non-anchor carrier to increase random access channel (RACH) capacity. During the RACH procedure, the UE may randomly select a random access carrier from the available set, which may include non-anchor carriers, based on a set probability distribution. Non-Anchor carriers may have different radio conditions than anchor carriers, due to frequency dependent interference and fading. Downlink narrowband reference signal received power (NRSRP) and reference signal received quality (RSRQ) are measured on anchor carriers, so downlink signal to interference plus noise ratio (DL-SINR) for non-anchor carriers may be unknown to the UE prior to the random access response (RAR) message-2 (MSG2) reception. While monitoring a RAR window for possible occurrences of RAR, narrowband reference signals (NRSs) are not guaranteed to be transmitted by the BS throughout the RAR window. Since NRS transmission may be guaranteed only in a common space search (CSS) containing the RAR grant and during the RAR narrowband physical downlink shared channel (NPDSCH), NRS based measurement of CINR prior to message-3 (MSG3) is limited by NRS.

In some use cases, a NB-IoT UE may be expected to report received NRSRP and DL-CINR in MSG3 during the random access procedure. At the BS, the following parameters may be derived using the reported DL-CINR and UE NRSRP: narrowband physical downlink control channel (NPDCCH) repetition to achieve a block error rate (BLER) target (e.g., <1%); NPDSCH modulation and coding scheme (MCS), and sub-frame number ($N_{SF}$) and repetition to achieve a BLER threshold (e.g., 10%), and NPDCCH maximum repetitions ($R_{MAX}$) and UE-specific search space for use in connected mode. In certain scenarios, however, problems may arise when generating UE reports. For example, a NB-IoT UE in idle mode has less stringent measurement requirements. As such, accurate CINR estimation in idle mode may require a greater number of NRS tones and increased wake-up time, which may not be desired. Further NRSRP and CINR estimated by the UE using NRS tones may become stale or oudated if the UE employs longer averaging on NRS tones, and such stale estimations are also not desired.

According to the present disclosure, to address one or more of the above issues, for message-1 (MSG1) transmission, DL-CINR estimate may not be needed and NRSRP estimation on an anchor carrier may be used to determine the coverage level. The UE may use legacy NRSRP and CINR estimation for internal consumption (configuring receiver/demodulator). In this case where the DL-CINR is not included in MSG1, the BS may transmit MSG2 with high repetition since the BS is not aware of the downlink CINR. However, the present disclosure allows the UE to have estimations of the NRSRP and CINR experienced by the UE when a message-4 (MSG4) is transmitted. The UE may measure accurate CINR estimation values for reporting purposes when the UE receives a response to MSG1 and a connection establishment request needs to be initiated. In a certain example, the NRSRP estimate made by the UE in idle mode may be allowed to have up to, for example, +/−6 dB variation. When NPDSCH for MSG2 is decoded, the re-constructed NPDSCH or NPDCCH signal may be used to estimate accurate downlink CINR, which may then be reported in MSG3. This may obviate the requirement of accurate CINR in idle mode and reduce the complexity of the UE in idle mode. The CINR that is estimated may be comparable to what the UE will experience while receiving MSG4. Also, in some implementations, the UE may measure accurate NRSRP and CINR on the non-anchor carrier, which may not be available in idle mode measurements. As such, the UE may report downlink conditions in a non-anchor carrier where sufficient NRS is not guaranteed by the BS. According to the present disclosure, estimation of CINR may not increase awake time on UE and power consumption on UE. The RACH procedure described herein may be applied to both anchor carriers and non-anchor carriers. Because the RACH procedure described herein does not impose additional requirement in idle mode CINR estimation, the idle power consumption may not be affected.

Thus, aspects of the present disclosure includes reporting the CINR to the BS during MSG3. The UE may use signals sent by the BS during MSG2 to estimate the CINR reported in MSG3. This estimation, when sent in MSG3, allows the BS to select the appropriate radio resource for subsequent transmissions.

Figure 6:
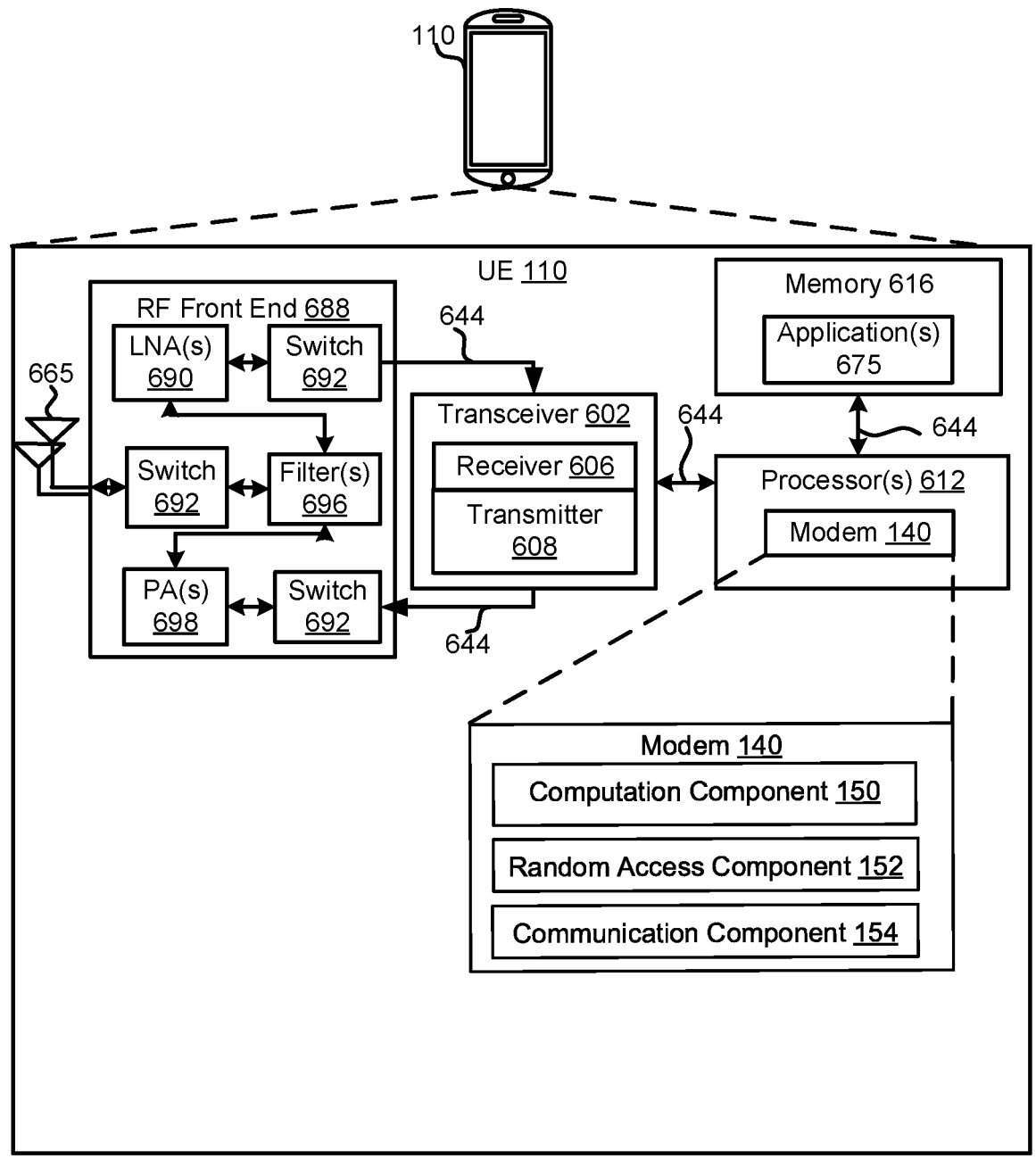
FIG. 6 is a schematic diagram of an example of a user equipment.

Referring to FIG. 1, in accordance with various aspects of the present disclosure, a wireless communication network 100 includes at least one UE 110 including a modem 140. The modem 140 may include a computation component 150 (as shown in FIG. 6) configured to estimate a CINR of a downlink channel, e.g., a physical downlink control and/or shared channel, based on the received signals sent by the BS. The modem 140 may further include an random access component 152 (as shown in FIG. 6) configured to generate a connection request. The request may include the estimate of the CINR. The modem 140 may include a communication component 154 (as shown in FIG. 6) configured to communicate with the BS 105, such as for receiving messages, and sending the CINR and the connection request to the BS 105.

Figure 7:
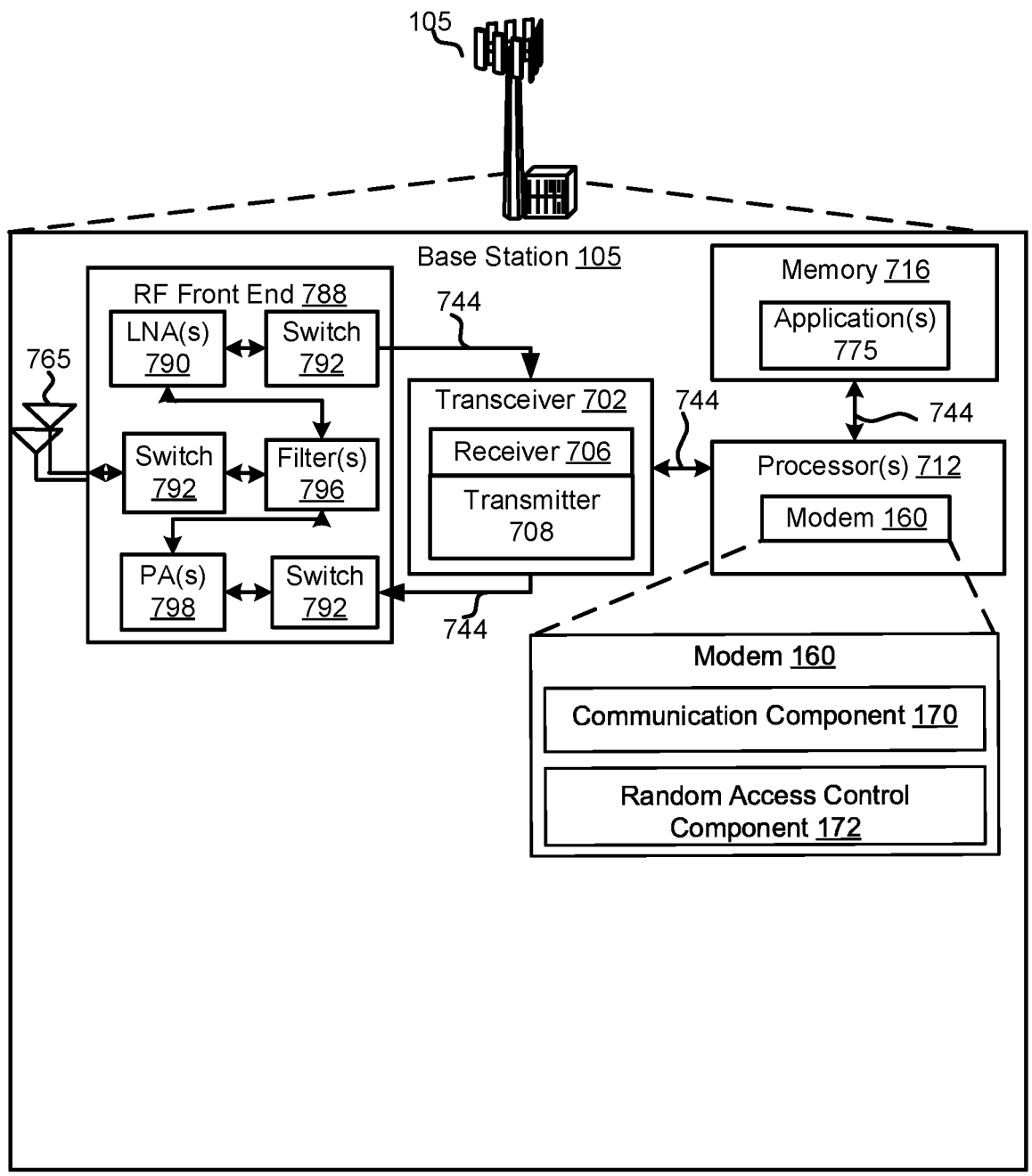
FIG. 7 is a schematic diagram of an example of a base station.

In some implementations, a modem 160 of the BS 105 may include a communication component 170 (as shown in FIG. 7) configured to transmit messages, e.g., a page, a random access response, to the UEs 110. The modem 160 may include random access control component 172 (as shown in FIG. 7). The random access control component 172 may generate a random access response that provides useful information to the UE 110 for establishing a communication link with the BS 105.

The modem 160 of a base station 105 may be configured to communicate with other base stations 105 and UEs 110 via a cellular network, a Wi-Fi network, or other wireless and wired networks. The modem 140 of a UE 110 may be configured to communicate with the base stations 105 via a cellular network, a Wi-Fi network, or other wireless and wired networks. The modems 140, 160 may receive and transmit data packets.

The wireless communication network 100 may include one or more base stations 105, one or more UEs 110, and a core network, such as an Evolved Packet Core (EPC) 180 and/or a 5G core (5GC) 190. The EPC 180 and/or the 5GC 190 may provide user authentication, access authorization, tracking, internet protocol (IP) connectivity, and other access, routing, or mobility functions. The base stations 105 configured for 4G LTE (collectively referred to as Evolved Universal Mobile Telecommunications System (UMTS) Terrestrial Radio Access Network (E-UTRAN)) may interface with the EPC 180 through backhaul links 132 (e.g., S1, etc.). The base stations 105 configured for 5G NR (collectively referred to as Next Generation RAN (NG-RAN)) may interface with the 5GC 190 through backhaul links 134. In addition to other functions, the base stations 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 105 may communicate with each other directly or indirectly (e.g., through the EPC 180 or the 5GC 190), with one another over backhaul links 125, 132, or 134 (e.g., Xn, X1, or X2 interfaces). The backhaul links 125, 132, 134 may be wired or wireless communication links.

The base stations 105 may wirelessly communicate with the UEs 110 via one or more base station antennas. Each of the base stations 105 may provide communication coverage for a respective geographic coverage area 130. In some examples, the base stations 105 may be referred to as a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for the EPC 180 or the 5GC 190 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Some non-limiting examples of UEs 110 may include a session initiation protocol (SIP) phone, a satellite radio, a global positioning system, a multimedia device, a video device, a digital audio player (e.g., MP3 player), a camera, a game console, a smart device, a wearable device, a vehicle, an electric meter, a gas pump, a large or small kitchen appliance, a healthcare device, an implant, a sensor/actuator, a display, or any other similar functioning device. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. Some examples of IoT devices may include parking meter, gas pump, toaster, vehicles, and heart monitor. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The communication links 135 may use multiple-input and multiple-output (MIMO) antenna technology, including spatial multiplexing, beamforming, and/or transmit diversity. The base stations 105 and/or UEs 110 may use spectrum up to Y MHz (e.g., 5, 10, 15, 20, 30, 50, 100, 200, 400, etc., MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 138. The D2D communication link 138 may use the DL/UL WWAN spectrum. The D2D communication link 138 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

The small cell may operate in a licensed and/or an unlicensed frequency spectrum. When operating in an unlicensed frequency spectrum, the small cell may employ NR and use the same 5 GHz unlicensed frequency spectrum as used by the Wi-Fi AP. The small cell, employing NR in an unlicensed frequency spectrum, may boost coverage to and/or increase capacity of the access network.

A base station 105, whether a small cell or a large cell (e.g., macro base station), may include an eNB, gNodeB (gNB), or other type of base station. Some base stations 105, such as a gNB may operate in a traditional sub 6 GHz spectrum, in millimeter wave (mmW) frequencies and/or near mmW frequencies in communication with the UE 110. When the gNB, such as a base station 105 operates in mmW or near mmW frequencies, the base station 105 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, and may also be referred to as centimeter wave. Communications using the mmW and/or near mmW radio frequency band has extremely high path loss and a short range. The mmW base station 105 may utilize beamforming with the UEs 110 in their transmissions to compensate for the extremely high path loss and short range.

In a non-limiting example, the EPC 180 may include a Mobility Management Entity (MME) 181, other MMEs 182, a Serving Gateway 183, a Multimedia Broadcast Multicast Service (MBMS) Gateway 184, a Broadcast Multicast Service Center (BM-SC) 185, and a Packet Data Network (PDN) Gateway 186. The MME 181 may be in communication with a Home Subscriber Server (HSS) 187. The MME 181 is the control node that processes the signaling between the UEs 110 and the EPC 180. Generally, the MME 181 provides bearer and connection management. All user Internet protocol (IP) packets are transferred through the Serving Gateway 183, which itself is connected to the PDN Gateway 186. The PDN Gateway 186 provides UE IP address allocation as well as other functions. The PDN Gateway 186 and the BM-SC 185 are connected to the IP Services 188. The IP Services 188 may include the Internet, an intranet, an IP Multimedia Subsystem (IMS), a PS Streaming Service, and/or other IP services. The BM-SC 185 may provide functions for MBMS user service provisioning and delivery. The BM-SC 185 may serve as an entry point for content provider MBMS transmission, may be used to authorize and initiate MBMS Bearer Services within a public land mobile network (PLMN), and may be used to schedule MBMS transmissions. The MBMS Gateway 184 may be used to distribute MBMS traffic to the base stations 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

Figure 2:
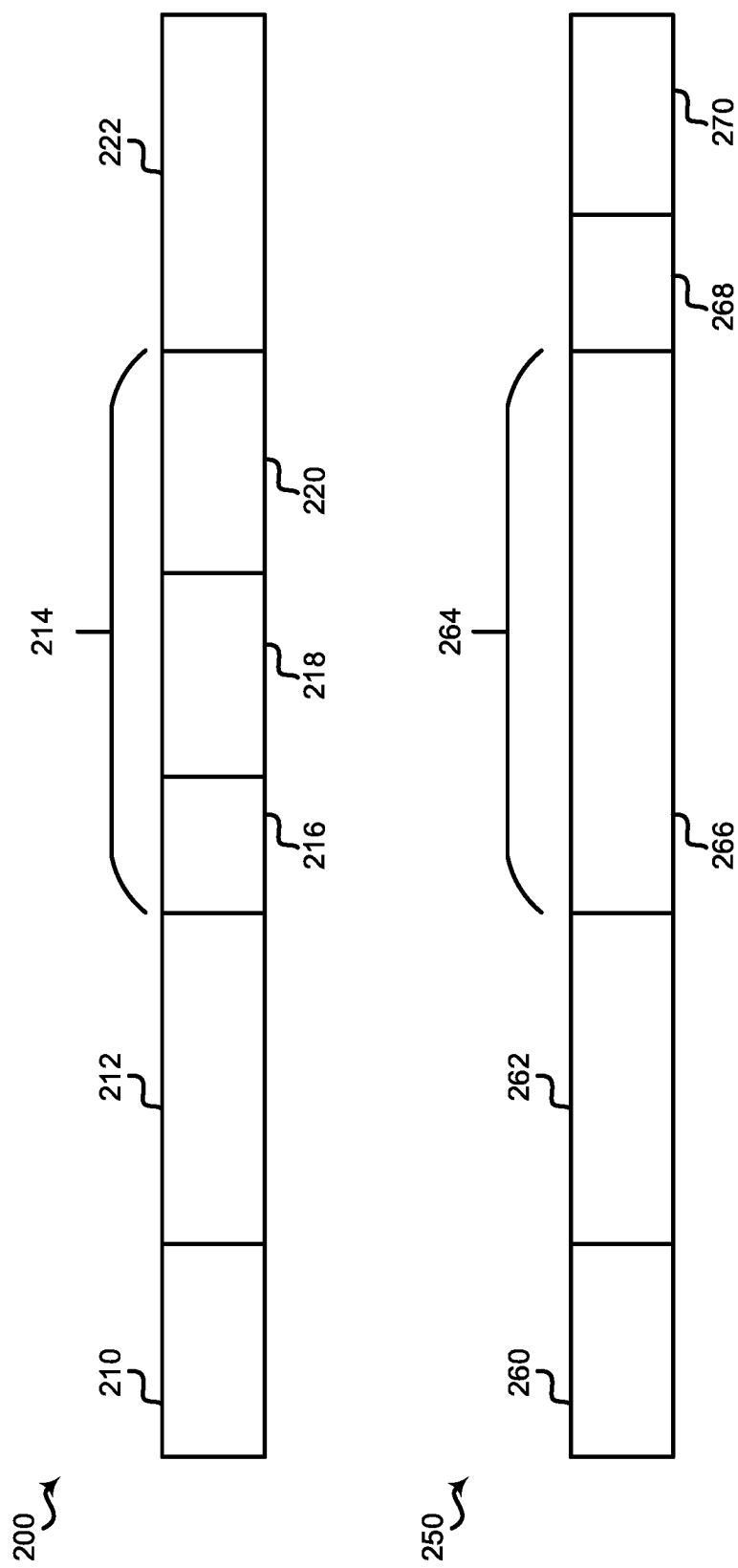
FIG. 2 is block diagram of two different examples of downlink subframes transmitted by a base station during a random access procedure.

Referring to FIG. 2, examples of different subframes 200, 250 that may be received by the UE 110 include subframes where reference signals may not be guaranteed.

The subframe 200 may include a first type of message sent by the BS 105 to the UE 110, such as a NPDCCH common space search type 1 message 214. The subframe 200 includes one or more subframes 210, 220, 222 where NRS is not guaranteed, and one or more subframes 212, 218 where NRS is available. For example, but not limited hereto, the subframe 212 may include 10 NB IoT downlink subframes and the subframe 218 may include 4 NB IoT downlink subframes. Within NPDCCH common space search type 1 message 214, one or more subframes 216 may include NPDCCH signals, as well as the previously mentioned subframes 218 and 220.

The subframe 250 may represent a second type of message sent by the BS 105 to the UE 110, such as a NPDCCH common space search type 2 message 264. The subframe 250 includes one or more subframes 260, 270 where NRS is not guaranteed, and one or more subframes 262, 266, 268 where NRS is available. For instance, but not to be construed as limiting, the subframe 262 may include 10 NB IoT downlink subframes and the subframe 268 may include 4 NB IoT downlink subframes. In subframes without NRS, the UE 110 may not rely on NRS to measure channel qualities.

Figure 3:
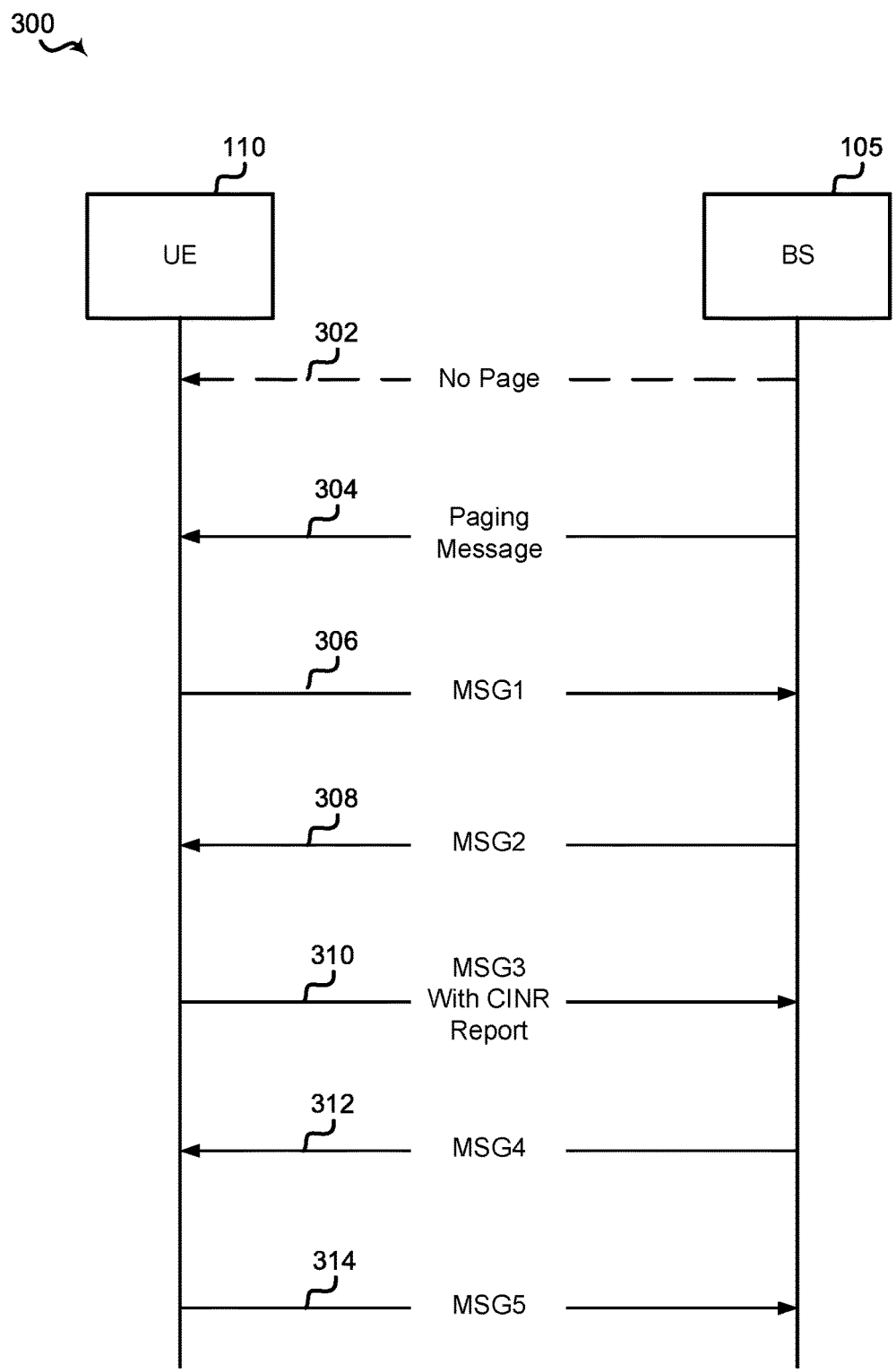
FIG. 3 is a message flow diagram of an example of messages exchanged between the UE and the BS during a random access procedure of the present disclosure.

Turning now to FIG. 3, a message flow 300 includes examples of messages exchanged between the UE 110 and the BS 105 during the random access procedure of the present disclosure. In some implementations, at step 302, the UE 110 may be monitoring for paging messages, but the BS 105 may not send out any paging messages.

At step 304, the BS 105 may send a paging message that is received by the UE 110. The paging message may include system information broadcasted to the UE 110, such as the available set of physical random access channel configurations, the available set of random access preambles, the random access response window size, the initial preamble power, the power ramping factor, the maximum number of preamble transmission, and/or the contention resolution timer.

After receiving the paging message, at step 306, the UE 110 may send a MSG1 of the random access procedure to the BS 105. For MSG1 transmission, a DL CINR estimate is not required and the MSG1 may instead include a NRSRP estimation on an anchor carrier, which may be used to determine the coverage level. The MSG1 may include a preamble index randomly selected by the UE 110 from a list of preamble indices, for example.

Next, at step 308, the BS 105 may send a MSG2 to the UE 110 in response to the MSG1. MSG2 may be sent with high repetition since the BS 105 is not aware of the downlink CINR. The MSG2 may include a random access response (RAR), which may include a random access radio network temporary identifier (RA-RNTI), a timing advance value, media access control data, a back-off indicator, and/or other information for the UE 110. The RAR may include a first signal corresponding to a RAR grant on a first physical channel, e.g., the RAR NPDCCH, and a second signal on a second physical channel, e.g., the RAR NPDSCH.

At step 310, the UE 110 may send a MSG3 with a CINR report (e.g., data message containing CINR estimation) to the BS 105. The MSG3 may include the CINR report and a connection request, e.g., a radio resource control (RCC) connection request. The UE 110 may estimate the CINR based on the RAR NPDCCH, the RAR NPDCCH, and/or the RAR NPDSCH. As such, the UE 110 may measure an accurate CINR for reporting purposes when it receives a response to MSG1 and a connection establishment request needs to be initiated. This avoids the requirement on the UE 110 of maintaining an accurate CINR in idle mode and reduces the complexity of the UE 110 in idle mode. Also, the CINR estimated may be comparable to what the UE 110 may experience while receiving MSG4, thereby meeting a condition that the UE 110 have an estimation of the NRSRP and CINR experienced by the UE 110 when MSG4 is transmitted. Also, in some implementations, the UE 105 may measure an accurate NRSRP and CINR on a non-anchor carrier, which is not available in idle mode measurements. As such, the UE 110 may report downlink conditions in the non-anchor carrier where sufficient NRS is not guaranteed by the BS 105.

The UE 110 may send the MSG3 using the physical uplink shared channel (PUSCH) resource allocated by the uplink grant specified by the RAR. The precise timing of PUSCH may be adjusted by the timing advance value in the RAR. The estimated CINR values may be derived from reconstructed transmission signals, such as NPDCCH or NPDSCH signals.

During the estimation of the CINR value, the downlink channels may be assumed to be substantially constant across a few sub-frames, and at least hundreds of tones are available per sub-frame. Alternatively, a same estimate may be derived from the combined logarithmic-likelihood ratio (LLR) since the quadrature phase shift keying LLRs scale the received signals. For example, in case of long repetitions, the combined LLR may be used for computation/estimation instead of storing NPDSCH data. Since the actual data from the downlink channels is used, the estimated CINR is the true channel quality data as seen by the data tones rather than the channel quality data of NRS tones. A received signal may be expressed as y(n)=h*x(n)+w(n), where n is the discrete time, y(n) is the received signal, h is the channel impulse response, x(n) is the transmitted signal, and w(n) is the noise. For a quadrature phase shift keying (QPSK) symbol, the logarithmic likelihood ratio may be expressed as $$LLR(n) = \frac{h_{est}^*}{\sigma_{est}^*} * y(n),$$

where $h_{est}^*$ is the estimated channel impulse response and $\sigma_{est}^*$ is the estimated noise variance. The total received power is $E[|y(n)|^2]=|h|^2+\sigma^2$, or equivalently, $E[x^*(n)*y(n)]=h$. The actual CINR is $$\frac{|h|^2}{\sigma^2}.$$

since it may difficult to measure the actual CINR, the estimated CINR may be calculated from the estimated signal power, $S=(\Sigma_{n=1}^{N} y(n)^* x_{reconstructed}(n))^2$, and the estimated total power, $T=\Sigma_{N=1}^{N} y(n)^* y^*(n)$. The estimated CINR equals to $$\frac{S}{T-S}.$$

At step 312, the BS 105 may send a MSG4 back to the UE 110 in response to the MSG3. The MSG4 may include an acknowledgement and/or a contention resolution identifier (ID) to alleviate any random access contention the UE 110 may have with other UEs 110 attempting random access.

At step 314, the UE 110 may send a MSG5 to the BS 105. The MSG5 may include a hybrid automatic repeat request (HARQ) acknowledgement (ACK).

Figure 4:
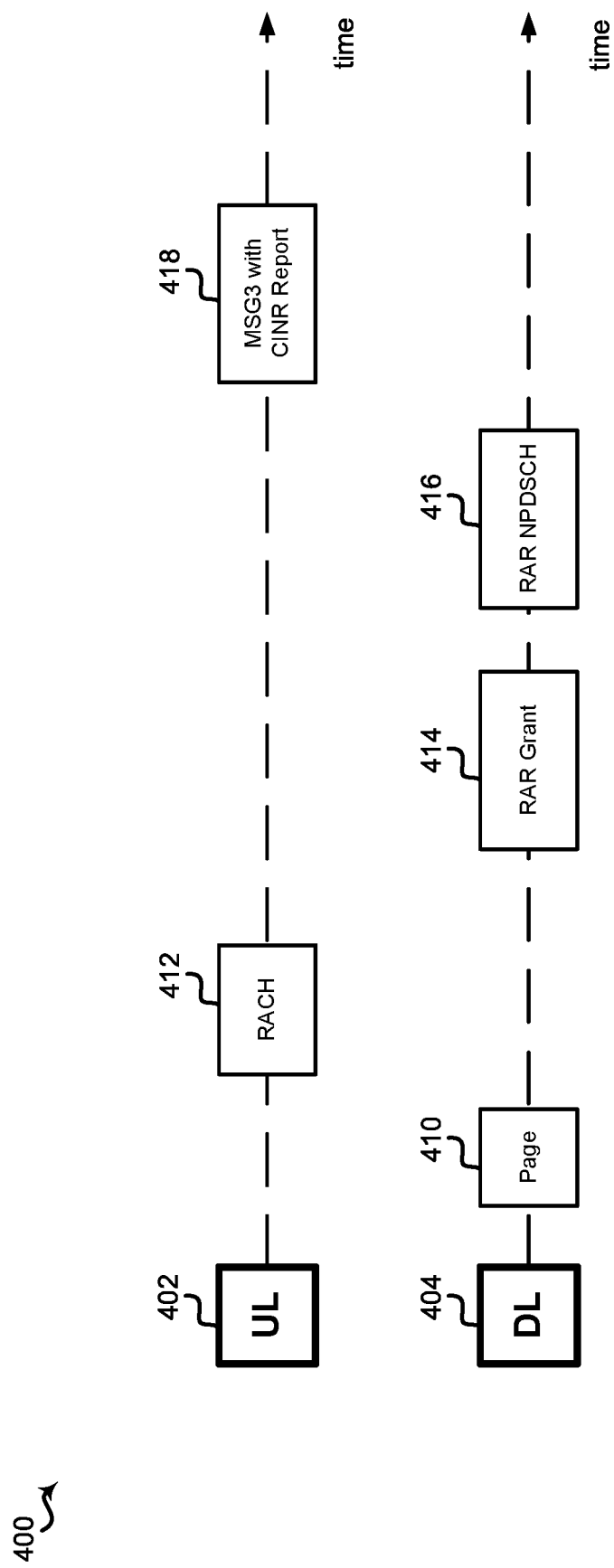
FIG. 4 is schematic diagram of an example of a subset of messages received by a UE on a downlink (DL) or transmitted by the UE on an uplink (UL) during the random access procedure of the present disclosure.

Turning now to FIG. 4, diagram 400 includes examples of a subset of the messages exchanged between the BS 105 and the UE 110 during the random access procedure (FIG. 3) via an uplink channel 402 and a downlink channel 404. A page 410 is transmitted on the downlink channel 404 from the BS 105 to the UE 110. The page 410 may include system information sent to the one or more UEs 110, such as the available set of physical random access channel configurations, the available set of random access preambles, the random access response window size, the initial preamble power, the power ramping factor, the maximum number of preamble transmission, and/or the contention resolution timer. A random access channel (RACH) request 412 is transmitted on the uplink channel 402 from the UE 110 to the BS 105. The RACH request 412 may include a preamble index randomly selected by the UE 110 form a list of preamble indices. The preamble index may be submitted by the UE 110 to the BS 105 to initialize the random access process. For the transmission of the RACH request 412 via the uplink 402, a CINR estimate may not be necessary and a NRSRP estimation on an anchor carrier may be used to determine the coverage level of the BS 105. A random access response (RAR), including a RAR grant 414 and a RAR NPDSCH 416, is transmitted on the downlink channel 404. The RAR grant 414 and the RAR NPDSCH 416 may include a random access radio network temporary identifier (RA-RNTI), a timing advance value, media access control data, a back-off indicator, reference signals, data, and/or other information for the UE 110. The RAR grant 414 and the RAR NPDSCH 416 may be sent with high repetition since the BS 105 may not have CINR information of the downlink channel 404. A MSG3 with CINR report 418 is transmitted on the uplink channel 402. The MSG3 with CINR report 418 may include a connection request and the CINR report, generated from the RAR grant 414 or the RAR grant 414 and the RAR NPDSCH 416, using, for example, the equations described above.

Figure 5:
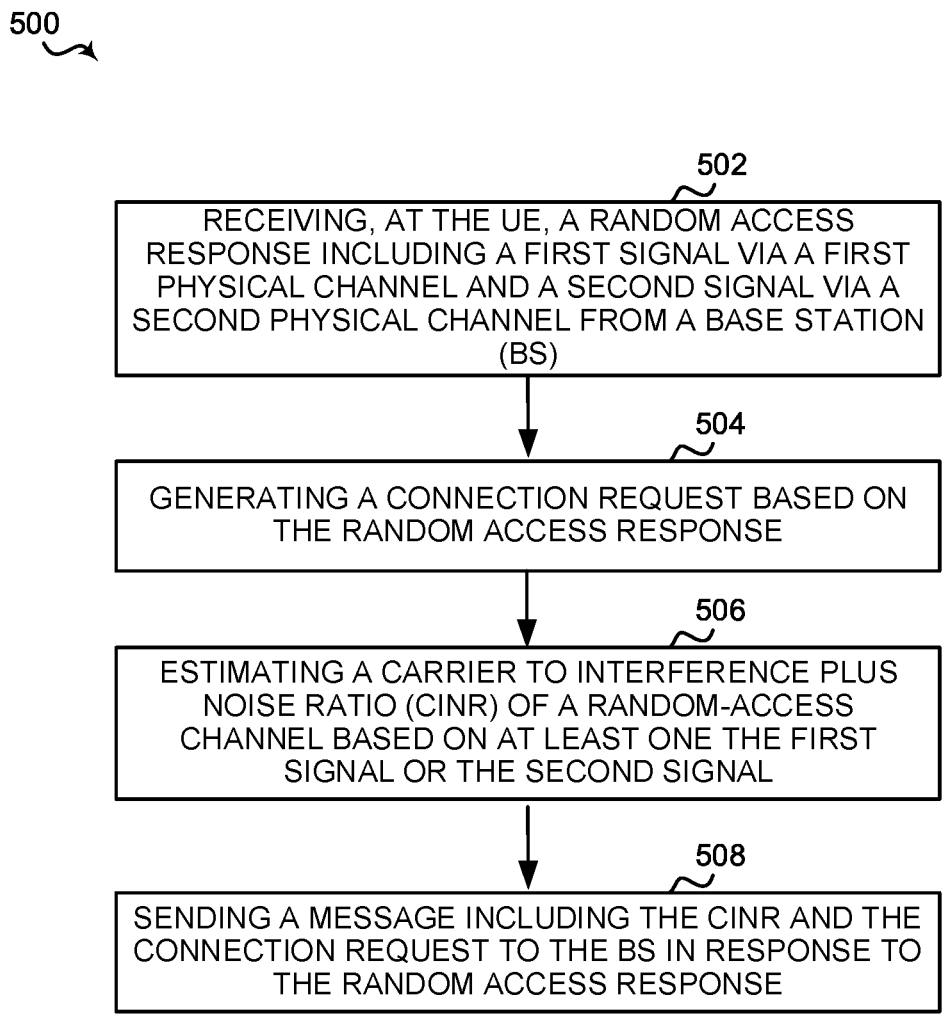
FIG. 5 is a flow chart of an example of a method of wireless communications, including at least a portion of the random access procedure of the present disclosure, performed by the UE.

Referring to FIG. 5, the UE 110 may perform an example of a method 500 of wireless communication, including at least a portion of the random access procedure of the present disclosure. In an example, the UE 110 may include a narrowband internet of things UE. In other examples, the method 500 may not increase the awake time of the UE 110 and may not increase the power impact. In some implementations, the method 500 may not impose additional requirements in the idle mode CINR estimation, and not affecting the idle power consumption of the UE 110.

At block 502, the method 500 may include receiving, at the UE, a random access response including a first signal via a first physical channel and a second signal via a second physical channel from the BS. For example, the communication component 154, the modem 140, and/or the processor 612 of the UE 110 may receive, at the UE 110, a random access response, e.g., MSG2 of the random access procedure, including a first signal via a first physical channel, e.g., RAR NPDCCH, and a second signal via a second physical channel, e.g., RAR NPDSCH, from the BS 105. The UE 110 may utilize one or more antennas 665, a RF front end 688, a transceiver 602, and/or a receiver 606 for receiving the random access response. The one or more antennas 665 may receive electro-magnetic signals. The RF front end 688 may filter, amplify, and/or extract electrical signals carried by the electro-magnetic signals. The transceiver 602 or the receiver 606 may digitize and convert the electrical signal into the data, such as the random access response, and send to the communication component 154. The random access response may be generated by the random access control component 172 of the BS 105. Further details regarding the actions performed at block 502 are described above with regard to the random access procedure of the present disclosure. In an implementation, the first physical channel may include a narrowband physical downlink control channel, the second physical channel may include a narrowband physical downlink shared channel, and the first signal and the second signal may include data signals. In certain implementations, receiving the random access response further includes receiving a timing advance value for adjusting a timing of physical uplink shared channel signal.

At block 504, the method 500 may include generating a connection request based on the random access response. For example, the random access component 152 may generate a connection request, e.g., a radio resource control connection request, based on information in the random access response. Further details regarding the actions performed at block 504 are described above with regard to the random access procedure of the present disclosure.

In certain examples, the UE 110 may send a random access request including a narrowband reference signal received power (NRSRP) estimation for an anchor carrier to the BS, wherein the random access response is in reply to the random access request. For example, the communication component 154, the modem 140, and/or the processor 612 of the UE 110 may send a random access request having a NRSRP estimation to the BS 105.

At block 506, the method 500 may include estimating a carrier to interference plus noise ratio of a random-access channel based on at least one the first signal or the second signal. For example, the computation component 150 may estimate a carrier to interference plus noise ratio of a random-access channel based on the first or second signals. Further details regarding the actions performed at block 506 are described above with regard to the random access procedure of the present disclosure. In some examples, estimating the CINR may include estimating for a non-anchor carrier. In other examples, the computation component 150 of the UE 110 may estimate a NRSRP for a non-anchor carrier in response to receiving the random access response. In certain implementations, the computation component 150 may estimate the CINR by dividing an estimated signal power by a difference between an estimated total power and the estimated signal power.

At block 508, the method 500 may include sending a message including the CINR and the connection request to the BS in response to the random access response. For example, the communication component 154, the modem 140, and/or the processor 612 may send a message, e.g., MSG3, including the CINR and the RRC request to the BS 105 in response to the random access response via a transceiver 602, a transmitter 608, a RF front end 688, and/or one or more antennas 665. The transceiver 602 or the transmitter 608 may convert the data in message into analog signals. The RF front end 688 may filter, amplify, and package the analog signals sent by the transmitter 602. Next, the RF front end 688 may cause the one or more antennas 665 to emit electro-magnetic signals containing the data in message. Further details regarding the actions performed at block 508 are described above with regard to the random access procedure of the present disclosure. In certain implementations, the UE 110 may receive, from the BS 105, contention resolution information in response to the message including the CINR and the connection request and connect to the BS using the contention resolution information.

Referring to FIG. 6, one example of an implementation of the UE 110 may include a variety of components, some of which have already been described above, but including components such as one or more processors 612 and memory 616 and transceiver 602 in communication via one or more buses 644, which may operate in conjunction with the modem 140, the computation component 150, the random access component 152, and the communication component 154 to enable one or more of the functions described herein related to communicating with the BS 105. Further, the one or more processors 612, modem 140, memory 616, transceiver 602, RF front end 688 and one or more antennas 665, may be configured to support voice and/or data calls (simultaneously or non-simultaneously) in one or more radio access technologies.

In an aspect, the one or more processors 612 may include the modem 140 that uses one or more modem processors. The various functions related to the computation component 150, the random access component 152, and the communication component 154 may be included in modem 140 and/or processors 612 and, in an aspect, may be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or the modem 140 associated with the communication component 154 may be performed by transceiver 602.

Also, memory 616 may be configured to store data used herein and/or local versions of applications 675 or the communication component 154 and/or one or more subcomponents of the communication component 154 being executed by at least one processor 612. Memory 616 may include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining the communication component 154 and/or one or more of its subcomponents, and/or data associated therewith, when UE 110 is operating at least one processor 612 to execute the computation component 150, the random access component 152, and the communication component 154 and/or one or more of their subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606, in conjunction with the computation component 150, may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. RF front end 688 may be coupled with one or more antennas 665 and may include one or more low-noise amplifiers (LNAs) 690, one or more switches 692, one or more power amplifiers (PAs) 698, and one or more filters 696 for transmitting and receiving RF signals.

In an aspect, LNA 690 may amplify a received signal at a desired output level. In an aspect, each LNA 690 may have a specified minimum and maximum gain values. In an aspect, RF front end 688 may use one or more switches 692 to select a particular LNA 690 and the specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and the specified gain value based on a desired gain value for a particular application.

Also, for example, one or more filters 696 may be used by RF front end 688 to filter a received signal to obtain an input RF signal. Similarly, in an aspect, for example, a respective filter 696 may be used to filter an output from a respective PA 698 to produce an output signal for transmission. In an aspect, each filter 696 may be coupled with a specific LNA 690 and/or PA 698. In an aspect, RF front end 688 may use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 may communicate with, for example, one or more base stations 105 or one or more cells associated with one or more base stations 105. In an aspect, for example, the modem 140 may configure transceiver 602 to operate at a specified frequency and power level based on the UE configuration of the UE 110 and the communication protocol used by the modem 140.

In an aspect, the modem 140 may be a multiband-multimode modem, which may process digital data and communicate with transceiver 602 such that the digital data is sent and received using transceiver 602. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of UE 110 (e.g., RF front end 688, transceiver 602) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network during cell selection and/or cell reselection.

Referring to FIG. 7, one example of an implementation of base station 105 may include a variety of components, some of which have already been described above, but including components such as one or more processors 712 and memory 716 and transceiver 702 in communication via one or more buses 744, which may operate in conjunction with the modem 160, the communication component 170, and the random access control component 172 to enable one or more of the functions described herein related to initialization of UEs 110. The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of the UE 110, as described above, but configured or otherwise programmed for base station operations as opposed to UE operations.

Figure 8:
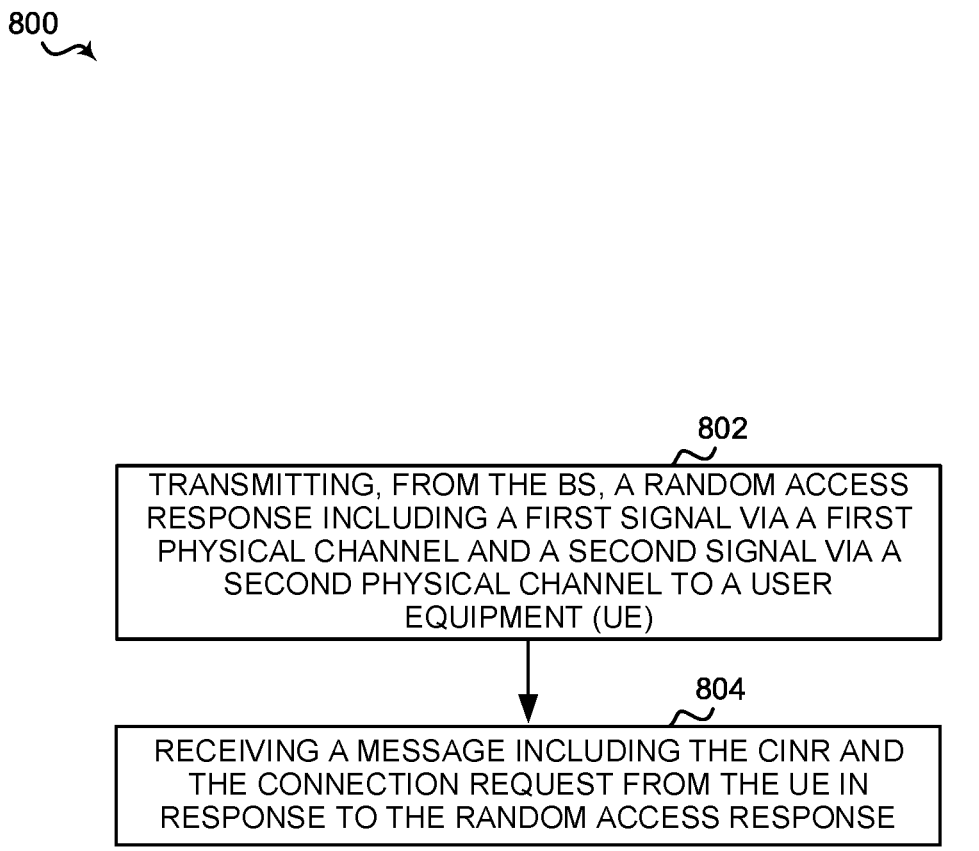
FIG. 8 is a flow chart of an example of a method of wireless communications, including at least a portion of the random access procedure of the present disclosure, performed by the BS.

Referring to FIG. 8, the BS 105 may perform an example of a method 800 of wireless communication, including at least a portion of the random access procedure of the present disclosure.

At block 802, the method 800 may include transmitting, at the BS, a random access response including a first signal via a first physical channel and a second signal via a second physical channel to a UE. For example, the communication component 170, the random access control component 172, the modem 160, and/or the processor 712 of the BS 105 may transmit a random access response, e.g., MSG2 of the random access procedure, including a first signal via a first physical channel, e.g., RAR NPDCCH, and a second signal via a second physical channel, e.g., RAR NPDSCH, to the UE 110. The transceiver 702 or the transmitter 708 may convert the data in random access response into analog signals. The RF front end 788 may filter, amplify, and package the analog signals sent by the transmitter 702. Next, the RF front end 788 may cause the one or more antennas 765 to emit electro-magnetic signals containing the data in message. The random access response may be generated by the random access control component 172. In an implementation, the first physical channel may include a narrowband physical downlink control channel, the second physical channel may include a narrowband physical downlink shared channel, and the first signal and the second signal may include data signals. In certain implementations, transmitting the random access response further includes transmitting a timing advance value for adjusting a timing of physical uplink shared channel signal.

At block 804, the method 800 may receive a message including the CINR and the connection request from the UE in response to the random access response. For example, the communication component 170, the modem 160, and/or the processor 712 of the BS 105 may receive a message, e.g., MSG3, including the CINR and the RRC request from the UE 110 in response to the random access response via the transceiver 702, the transmitter 708, the RF front end 788, and/or the one or more antennas 765. The one or more antennas 765 may receive electro-magnetic signals. The RF front end 788 may filter, amplify, and/or extract electrical signals carried by the electro-magnetic signals. The transceiver 702 or the receiver 706 may digitize and convert the electrical signal into the data, such as the random access response. In certain implementations, the BS 105 may transmit contention resolution information.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   receiving, at the UE, a random access response including a first signal via a first physical channel and a second signal via a second physical channel from a base station (BS);
   generating a connection request based on the random access response;
   estimating a carrier to interference plus noise ratio (CINR) of a random-access channel based on at least one of the first signal or the second signal; and
   sending a message including the CINR and the connection request to the BS in response to the random access response,
   wherein estimating the CINR comprises dividing an estimated signal power by a difference between an estimated total power and the estimated signal power.

2. The method of claim 1, wherein the first physical channel comprises a narrowband physical downlink control channel, the second physical channel comprises a narrowband physical downlink shared channel, and the first signal and the second signal comprise data signals.

3. The method of claim 1, further comprising:
   sending a random access request including a narrowband reference signal received power (NRSRP) estimation for an anchor carrier to the BS, wherein the random access response is in reply to the random access request.

4. The method of claim 1, further comprising:
   receiving, from the BS, contention resolution information in response to the message including the CINR and the connection request; and
   connecting to the BS using the contention resolution information.

5. The method of claim 1, wherein estimating the CINR comprises estimating the CINR for a non-anchor carrier.

6. The method of claim 1, further comprising estimating a narrowband reference signal received power (NRSRP) for a non-anchor carrier in response to receiving the random access response.

7. The method of claim 1, wherein receiving the random access response further includes receiving a timing advance value for adjusting a timing of physical uplink shared channel signal.

8. The method of claim 1, wherein the UE is a narrowband internet of things UE.

9. A user equipment (UE), comprising
   a memory;
   a transceiver;
   one or more processors operatively coupled to the memory and the transceiver, the one or more processors being configured to:
   receive, via the transceiver at the UE, a random access response including a first signal via a first physical channel and a second signal via a second physical channel from a base station (BS);
   generate a connection request based on the random access response;
   estimate a carrier to interference plus noise ratio (CINR) of a random-access channel based on at least one of the first signal or the second signal; and
   send, via the transceiver, a message including the CINR and the connection request to the BS in response to the random access response,
   wherein estimating the CINR comprises dividing an estimated signal power by a difference between an estimated total power and the estimated signal power.

10. The UE of claim 9, wherein the first physical channel comprises a narrowband physical downlink control channel, the second physical channel comprises a narrowband physical downlink shared channel, and the first signal and the second signal comprise data signals.

11. The UE of claim 9, wherein the one or more processors are further configured to send a random access request including a narrowband reference signal received power (NRSRP) estimation for an anchor carrier to the BS, wherein the random access response is in reply to the random access request.

12. The UE of claim 9, wherein the one or more processors are further configured to:
   receive, from the BS, contention resolution information in response to the message including the CINR and the connection request; and
   connect to the BS using the contention resolution information.

13. The UE of claim 9, wherein estimating the CINR comprises estimating the CINR for a non-anchor carrier.

14. The UE of claim 9, wherein the one or more processors are further configured to estimate a narrowband reference signal received power (NRSRP) for a non-anchor carrier in response to receiving the random access response.

15. The UE of claim 9, wherein receiving the random access response further includes receiving a timing advance value for adjusting a timing of physical uplink shared channel signal.

16. The UE of claim 9, wherein the UE is a narrowband internet of things UE.

17. A non-transitory computer-readable medium having instructions stored therein that, when executed by one or more processors of a user equipment (UE), cause the one or more processors to:
   receive, at the UE, a random access response including a first signal via a first physical channel and a second signal via a second physical channel from a base station (BS);
   generate a connection request based on the random access response;
   estimate a carrier to interference plus noise ratio (CINR) of a random-access channel based on at least one of the first signal or the second signal; and
   send a message including the CINR and the connection request to the BS in response to the random access response,
   wherein estimating the CINR comprises dividing an estimated signal power by a difference between an estimated total power and the estimated signal power.

18. The non-transitory computer-readable medium of claim 17, wherein the first physical channel comprises a narrowband physical downlink control channel, the second physical channel comprises a narrowband physical downlink shared channel, and the first signal and the second signal comprise data signals.

19. The non-transitory computer-readable medium of claim 17, further comprising instructions that, when executed by the one or more processors of the UE, cause the one or more processors to send a random access request including a narrowband reference signal received power (NRSRP) estimation for an anchor carrier to the BS, wherein the random access response is in reply to the random access request.

20. The non-transitory computer-readable medium of claim 17, further comprising instructions that, when executed by the one or more processors of the UE, cause the one or more processors to:
receive, from the BS, contention resolution information in response to the message including the CINR and the connection request; and
connect to the BS using the contention resolution information.

21. The non-transitory computer-readable medium of claim 17, wherein estimating the CINR comprises estimating the CINR for a non-anchor carrier.

22. The non-transitory computer-readable medium of claim 17, further comprising instructions that, when executed by the one or more processors of the UE, cause the one or more processors to estimate a narrowband reference signal received power (NRSRP) for a non-anchor carrier in response to receiving the random access response.

23. The non-transitory computer-readable medium of claim 17, wherein receiving the random access response further includes receiving a timing advance value for adjusting a timing of physical uplink shared channel signal.

24. The non-transitory computer-readable medium of claim 17, wherein the UE is a narrowband internet of things UE.

25. A user equipment (UE), comprising:
means for receiving, at the UE, a random access response including a first signal via a first physical channel and a second signal via a second physical channel from a base station (BS);
means for generating a connection request based on the random access response;
means for estimating a carrier to interference plus noise ratio (CINR) of a random-access channel based on at least one the first signal or the second signal; and
means for sending a message including the CINR and the connection request to the BS in response to the random access response,
wherein estimating the CINR comprises dividing an estimated signal power by a difference between an estimated total power and the estimated signal power.

26. The UE of claim 25, wherein the first physical channel comprises a narrowband physical downlink control channel, the second physical channel comprises a narrowband physical downlink shared channel, and the first signal and the second signal comprise data signals.

27. The UE of claim 25, wherein means for estimating the CINR comprises means for estimating for a non-anchor carrier.

28. The UE of claim 25, further comprising:
means for sending a random access request including a narrowband reference signal received power (NRSRP) estimation for an anchor carrier to the BS, wherein the random access response is in reply to the random access request.

29. The UE of claim 25, further comprising:
means for receiving, from the BS, contention resolution information in response to the message including the CINR and the connection request; and
means for connecting to the BS using the contention resolution information.

30. The UE of claim 25, further comprising means for estimating a narrowband reference signal received power (NRSRP) for a non-anchor carrier in response to receiving the random access response.

* * * * *